United States Patent [19]

Fujii

[11] 4,009,768
[45] Mar. 1, 1977

[54] CALIPER BRAKE FOR A BICYCLE
[75] Inventor: Yuji Fujii, Sakai, Japan
[73] Assignee: Shimano Industrial Company, Limited, Osaka, Japan
[22] Filed: Feb. 19, 1976
[21] Appl. No.: 659,568
[52] U.S. Cl. .............................................. 188/24
[51] Int. Cl.² .......................................... B62L 1/12
[58] Field of Search .................. 188/24, 25, 26, 27, 188/71.1, 72.9

[56] References Cited
FOREIGN PATENTS OR APPLICATIONS
914,557 6/1946 France .............................. 188/24
194,352 3/1923 United Kingdom ................. 188/24

Primary Examiner—George E. A. Halvosa
Attorney, Agent, or Firm—Stevens, Davis, Miller & Mosher

[57] ABSTRACT

A caliper brake for a bicycle, which has a pivot support and an enlarged diameter portion, which pivot support is formed independently of a bolt for mounting the brake on the bicycle frame and pivotally supporting a pair of brake arms with brake shoes so as to form a major portion of the brake and which enlarged diameter portion is formed of a threaded hole screwable with the bolt. The bolt is made detachable and only selected from ones of various lengths so that the major portion may be made variable to meet any kind and size of the bicycle and the brake applying position thereto to thereby make the major portion available in common.

4 Claims, 4 Drawing Figures

CALIPER BRAKE FOR A BICYCLE

This invention relates to a caliper brake for a bicycle and more particularly to a caliper brake having a pair of brake arms with brake shoes corresponding to a rim of the bicycle wheel respectively, which arms are adapted to swing in a given range by a pull of a control wire so as to bring the brake shoes into contact with the rim thereby exerting the braking action.

Generally, a caliper brake employs a mounting bolt having a regular length and rotatably supporting the aforesaid brake arms, and is mounted to the bicycle frame through the bolt extending through a bore at the frame and being tightened with a nut screwed therewith.

The bore at the frame is usually varied in its depth or its location with respect to the wheel because the frame is different in its structure and size according to various kinds and sizes of the bicycle. Also, even when the bicycle is of the same kind and size, the bore is the same as abovementioned, different according to whether the brake is applied to either the rear or the front wheel.

The difference of the bore can be offset by use of a previously elongated bolt so that the bolt may meet a length of the brake mounting portion on the frame, variable from the difference of the bore in depth or location thereof, however, if the bore is too small in depth, the bolt occasionally projects from the frame so as to incur, especially in the brake attached to the front wheel, the fear that a cyclist may be, while riding, caught by the protruding tip of the bolt, which is undesirable for safety purposes.

Hence, various kinds of brakes have hitherto been formed with a selected bolt of the optimum length corresponding to any kind, size or brake mounting position of the bicycle and with the brake arms assembled to the bolt.

However, the preparation of many kinds of brakes having each brake mounting portion of the optimum length corresponding to any kind and size of the bicycle or the brake application to either the front or rear wheel, is extremely disadvantageous in the management as well as process of the manufacturing brakes, resulting in a comparatively high cost of the products.

A finished caliper brake including the one mounting bolt and the brake arms assembled therewith is mounted on the bicycle by means of the bolt; then, each of the pair of the brake shoes is so regulated as to be uniformally spaced with respect to the rim.

The regulation should be carried out simultaneously with screwing a tightening nut with the bolt so that not only the brake mounting is very troublesome but also an accurate location of each of the shoes is not completely expected. When each of the brake shoes is found to be nonuniformly spaced with respect to the rim after the nut is screwed, the difference of the spaces should be corrected, otherwise a one-shoe braking effect will occur.

The correction after the nut tightening has hitherto been carried out by hammering the brake arms or gripping the bolt at its enlarged diameter portion by means of a desired hand tool. In this instance, there are drawbacks such that the hammering is liable to mar the brake arm and make difficult the precise adjustment and that the gripping replies the tool to be applied on the enlarged diameter portion in a restricted space between the brake arm and the frame; hence, the work is troublesome and a worker finds it hard to exactly adjust the shoes because he should work without watching the brake shoes.

This invention has been designed in view of the aforesaid drawbacks in the conventional caliper brake. A main object of the invention is the provision of a caliper brake capable of being easily adjustable of the brake mounting portion to the bicycle frame, in the optimum length even if a bore in the frame varies in its location corresponding to a rim of the bicycle wheel, and in its depth, due to a different kind and size of the bicycle or a different location of applying the brake to either the front or the rear wheel, so that various kinds of brakes having the mounting bolts of various lengths are not necessary to be prepared to thereby make the brake more economically profitable.

Another object of the invention is the provision of a caliper brake easily mountable to the bicycle frame and also adjustable of the difference of the space of each of the brake shoes with respect to the rim by only one worker.

This invention is characterized in that, first, the structure of the conventional caliper brake, such that one bolt rotatably supports the brake arms therewith and mounts the brake to the bicycle frame, is divided into a support for carrying thereon the brake arms and a means for mounting the brake to the bicycle frame, mainly composed of a mounting bolt, so that the former may be assembled with the brake arms to form a brake major portion and the latter separated from the support may attach the brake major portion to the bicycle frame; and second, the support is provided at the tip of a pivot thereof with a rotary control for the support.

As seen from the first feature as aforesaid, the brake major portion being composed of the support assembled with the brake arms, only change of an axial length of the mounting means enables the brake mounting portion to the frame to be desirably adjusted in its axial length so that the brake mounting portion may easily correspond to any size of the mounting frame even if it is different due to a kind or size of the bicycle or location for the brake application thereto, thus the mounting means can be made most suitably long corresponding to the frame. Accordingly, the brake major portion with the brake arms can be available in common regardless of various kinds, sizes or the brake applying position of the bicycle thereby making the assembly simple and the management easy.

From the second feature, when a difference is found between the spaces of the shoes with respect to the rim after the caliper brake is attached to the bicycle frame, only one worker can easily, exactly correct it.

These and other objects and features of the invention will become more apparent from the following description of embodiments in connection with the accompanying drawing, in which.

Figure 1:
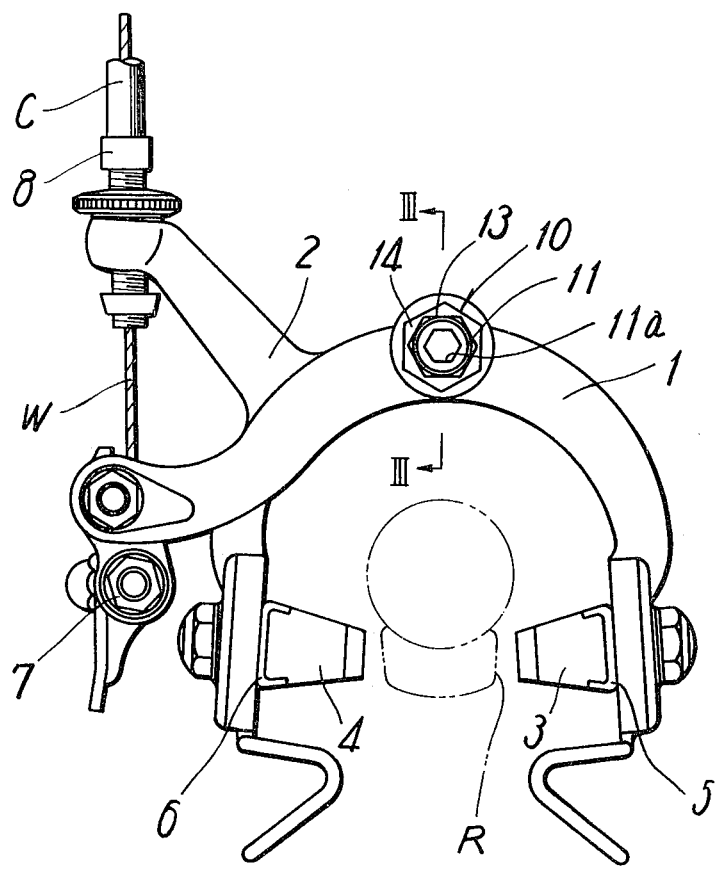
FIG. 1 is a front view of a caliper brake in accordance with the invention.
Figure 2:
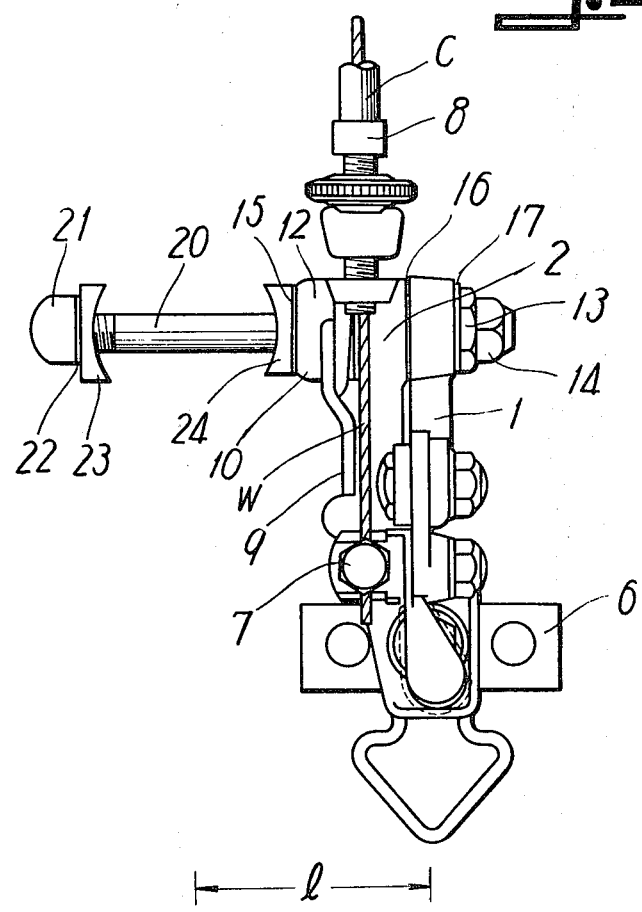
FIG. 2 is a side view thereof.

Referring to the drawings, the caliper brakes of the side brake system are shown, which generally comprises a pair of brake arms 1 and 2, a pair of brake shoes 3 and 4 carried on the brake arms respectively, a support 10 rotatably supporting the brake arms 1 and 2, and a mounting means 20 for mounting the caliper brake to a bicycle frame.

One arm 1 of the pair of the brake arms is C-like shaped and the other 2 is Y-like shaped, the former having at its one idle end a retainer 7 for retaining thereto a terminal of a well known inner wire w and at the other end one brake shoe 3 attached thereto and at a substantially intermediate portion of the arm 1 a bore 1a to be inserted with a support 10 to be described hereinafter. The Y-like shaped brake arm 2 has three ends one of which carries a retainer 8 for an outer cable c covering the inner wire w therewith and another of which carries the other brake shoe 4 corresponding to the brake shoe 3 and still another end of which is provided with a bore 2a into which the support 10 is inserted.

The pair of the brake shoes 3 and 4 are secured to the brake arms 1 and 2 with a bolt and nut through a holder 5 in the relation that both the shoes, as shown with dotted lines in FIG. 1, are located opposite to both lateral sides of a rim R of the bicycle respectively, so that the brake arms 1 and 2 swing to urge the brake shoes 3 and 4 to be in contact with both the lateral sides of the rim R respectively to thereby brake the bicycle wheel.

The inner wire w for controlling the brake arms extends to reach a handle bar of the bicycle and is attached at a terminal thereof to a control lever (not shown) attached to the handle bar, hence, the inner wire w is pulled by the lever to move the brake arms so that the brake shoes 3 and 4 may be brought into contact with both the lateral sides of the rim of the wheel respectively. In addition, between both the brake arms 1 and 2 there is provided a return spring 9, as is well known, against a pull of the wire w. When the inner wire w is released after the braking action is finished, the return spring 9 acts to restore the brake arms 1 and 2 to the position shown in FIG. 1 so that the brake shoes 3 and 4 leave both the lateral sides of the rim R respectively.

The aforesaid construction of the caliper brake is not novel as it is the same as that of a conventional one. The caliper brake of the invention is adapted to pivotally support both the brake arms 1 and 2 by means of a support 10 described in greater detail hereinafter and to be mounted on the bicycle frame F by means of a mounting means 20 mainly composed of a bolt and separated from the support 10.

Figure 3:
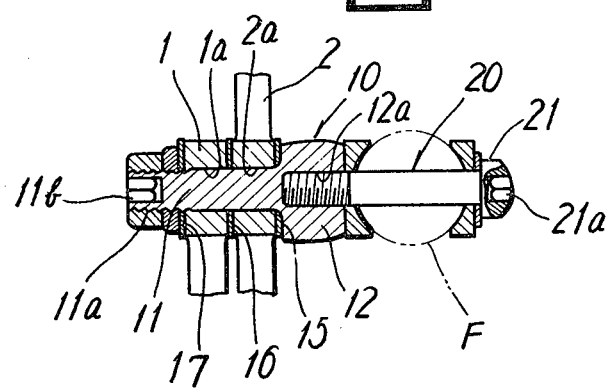
FIG. 3 is a partially cutaway longitudinal section of a principal portion of the caliper brake taken on Line III—III in FIG. 1.
Figure 4:
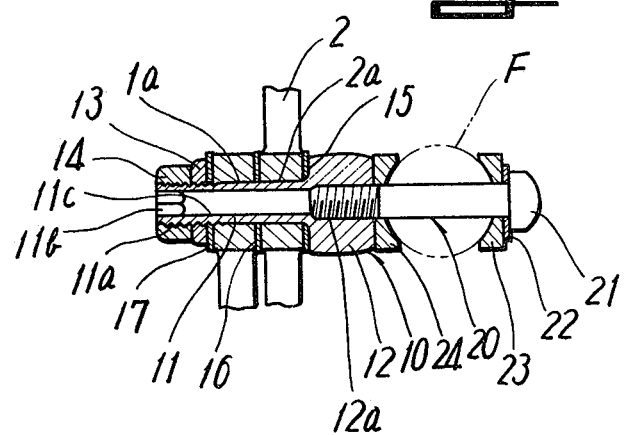
FIG. 4 is a longitudinal section of a modified embodiment, showing a principal portion thereof corresponding to that in FIG. 3.

Namely, the brake arms 1 and 2 are supported not with one bolt as in a conventional brake but with a support 10 which is formed independently of the mounting means 20 attaching the brake to the bicycle frame so that a brake major portion is formed to be mounted on the bicycle frame through the mounting means 20. The support 10 comprises, as shown in FIG. 3, a pivot 11 and an enlarged diameter portion 12. The former is, as shown in FIG. 3, provided with a round outer periphery supporting thereon the brake arms 1 and 2 and with screw threads 11a at the outer periphery of the foremost end of the same and the latter axially extends integrally of the pivot 11 from one end thereof and has at the center of one end surface a threaded bore 12a extending axially of the pivot 11.

To the pivot 11 are supported the brake arms 1 and 2 in a manner that the pivot 11 is inserted from its foremost end into bores 1a and 2a formed at the brake arms 1 and 2 respectively and the threads 11a are screwed with a tightening nut 13 and a lock nut 14, the tightening nut 13 being tightened in the relation that the brake arms 1 and 2 are rotatable with respect to the pivot 11. Washers 15, 16 and 17 are inserted between the shoulder of the enlarged diameter portion 12 and the brake arm 2, both the brake arms 1 and 2 adjacent to each other, and the brake arm 1 and the tightening nut 13 respectively.

Thus, the brake arms 1 and 2 are mounted on the pivot 11 to complete the brake major portion fully providing the braking mechanism, the brake major portion being available in common without regard to any kind and size of the bicycle or any position for applying the brake thereto.

The aforesaid brake major portion is adapted to be mounted to the bicycle frame by means of a mounting means 20. The mounting means 20 is screwed with the threaded bore 12a at the enlarged diameter portion 12 to be fixedly connected with the support 10 and is formed of a rod member having at its one end screw threads in mesh with the threaded bore 12a and at the other end a rotary control, the rod member being mainly formed of a headed bolt.

Now, an embodiment including the mounting means 20 of a headed bolt, will be detailed in the following description.

The headed bolt is hereinafter denoted with the same reference numeral 20, the same as the mounting means.

The headed bolt 20 is provided at the surface of the head 21 thereof a rotary control 21a, preferably a polygonal bore, serving to rotatably control the bolt, and used to attach the brake major portion to the bicycle frame F in the following manner such that the bolt 20 is inserted through a bore of the frame and then screwably secured at the threads of the tip thereof to the threaded hole 12a of the enlarged diameter portion 12. In detail, the bolt 20 is, as shown in FIG. 3, previously inserted with a washer 22 and a washer 23 of a pair of washers 23 and 24 which are concaved at the opposite surfaces thereof to be coincident with the round surface of the bicycle frame F; is extended through the bore of the frame F; is inserted with the other washer 24 opposite to the washer 23; and is screwed at the tip thereof with the threaded bore 12a to be tightly connected with the mounting means, whereby the brake major portion is exactly secured to the bicycle frame F.

The headed bolt 20, which is applicable to be easily set with the support 10, makes it possible to settle a horizontal distance 1 between the axial center of the brake mounting portion to the frame and the radial center of the bolts supporting the brakes shoes 3 and 4 aligned in a line. The distance 1 can be made the optimum by selecting one bolt from bolts of various lengths so as to meet the kind, size or the brake application to either the front or the rear wheel of the bicycle to employ the caliper brake.

Incidentally, easy preparation of many bolts different in length will not result in disadvantages in the management as well as manufacturing of the caliper brake.

Next, the correction of the brake shoe locations will be described in the following.

The caliper brake of the invention has the structure that the brake shoes 3 and 4 can be easily corrected to be properly spaced with respect to the rim R by use of the support 10 and the mounting means 20 which are separated from each other.

This structure has at the foremost end of the pivot 11 of the support 10 a means for rotatably constrolling the support. The means is, as shown in FIG. 3, represented by a polygonal recess 11b formed centrally of the end surface of the pivot 11, the recess being engageable with a tool, such as a hexagon wrench key.

Other than the recess 11b, the aforesaid rotary control means may be formed in a through hole 11c at the center radially of the support 10 and extending axially thereof so that the hole 11c is formed polygonal at an end portion thereof at the pivot foremost end side. In this instance, the hole 11c is provided at the enlarged diameter portion 12 side with screw threads forming the threaded bore 12a. As a result the rotary control means formed at the foremost end portion of the pivot 11 can, by use of the hexagonal wrench key or the like, rotate the support 10 as it is attached to the frame F to thereby easily correct the space between the rim R and each of the brake shoes 3 and 4.

Namely, on mounting the caliper brake on the bicycle frame F, nonuniform spaces between the rim R and the brake shoes 3 and 4 tend to cause an uneven braking effect, resulting in a correction requirement. The correction can, as aforesaid, be readily carried out by rotating the support 10 with the hand tool engaged with the rotary control means, and also accurately by rotatably adjusting the support while a worker is watching at the front of the caliper brake, whereby each of the brake shoes 3 and 4 is properly located with respect to the rim R.

As seen from the aforesaid description, the caliper brake of the invention can be finished only by screwing the support with one bolt selected from previously prepared ones of various lengths and also the brake mounting portion to the frame can be selected a desirable length.

Accordingly, the caliper brake of the invention is applicable to any kind, size or location at either the front or the rear wheel of the bicycle only by changing the aforesaid mounting bolt to meet the location or depth of the bore of the frame so that it is not necessary to prepare various caliper brakes corresponding to every kind, size or location to the front or rear wheel of the bicycle but only enough to provide a lot of the mounting bolts of different lengths only, whereby the brake major portion comprising the brake arms with the brake shoes and the support, is available in common. Hence, the brake major portion can be mass-produced with easy production and management.

Furthermore, since the brake arms swing around the pivot of the support, the pivot can be formed greater in diameter than a conventional mounting bolt thereby supporting the brake arms in a steady condition.

Still further, when each of the brake shoes is found to be nonuniformly spaced with respect to the rim after mounting the caliper brake, the difference of the spaces can be carried out easily and exactly.

While an embodiment of the invention has been shown and described, the invention is not limited to the specific construction thereof, which is merely exemplified in the specification rather than defined.

What is claimed is:

1. A side-pull type caliper brake for a bicycle having a frame and a wheel including a rim, comprising:
    a. a pair of brake shoes on opposite sides of the rim, respectively;
    b. a pair of brake arms carrying said brake shoes, respectively, one of said brake arms being C-like shaped and the other of said brake arms being Y-like shaped;
    c. a single support, rotatably supporting said brake arms, including a pivot having a first portion including an outer periphery supporting thereon said brake arms and a second enlarged diameter portion extending integrally from one end of said first portion, said first portion at the other end thereof having first screw threads at said outer periphery and a first rotary control means for adjusting the space between the rim and each of said brake shoes, said enlarged diameter portion having a first bore extending axially of said pivot and including second inner screw threads; and
    d. mounting means, independently connected to said single support, including a rod-like member having at one end third screw threads in mesh with said second inner screw threads, and secondary rotary control means, at the other end of said rod-like member, for attaching said single support to the frame.

2. A brake according to claim 1 wherein said first rotary control means includes a polygonal recess at the center of the end face of said other end of said first portion.

3. A brake according to claim 1 wherein said first rotary control means includes a second bore at the radial center of said first portion and extending axially thereof from said other end of said first portion to said second inner threads, said second bore at the end face of said other end of said first portion having a polygonal shape.

4. A brake according to claim 1 wherein said second rotary control means includes a head on said rod-like member and having a polygonal recess for rotatably controlling said rod-like member.

* * * * *